US011760064B2

(12) United States Patent
Wang et al.

(10) Patent No.: US 11,760,064 B2
(45) Date of Patent: Sep. 19, 2023

(54) LAMINATED STEEL HAVING EXTREMELY LOW INTERFACE BUBBLE RATE AND METHOD FOR MANUFACTURING SAME

(71) Applicant: BAOSHAN IRON & STEEL CO., LTD., Shanghai (CN)

(72) Inventors: Zhangwei Wang, Shanghai (CN); Junsheng Wei, Shanghai (CN); Long Xie, Shanghai (CN); Hongxing Chen, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 389 days.

(21) Appl. No.: 16/771,933

(22) PCT Filed: Dec. 10, 2018

(86) PCT No.: PCT/CN2018/120006

§ 371 (c)(1),
(2) Date: Jun. 11, 2020

(87) PCT Pub. No.: WO2019/114641

PCT Pub. Date: Jun. 20, 2019

(65) Prior Publication Data

US 2020/0391481 A1 Dec. 17, 2020

(30) Foreign Application Priority Data

Dec. 13, 2017 (CN) ......................... 201711324503.4

(51) Int. Cl.

| | |
|---|---|
| ***B32B 7/022*** | (2019.01) |
| ***B32B 15/09*** | (2006.01) |
| ***B32B 15/18*** | (2006.01) |
| ***B32B 37/06*** | (2006.01) |
| ***B32B 37/10*** | (2006.01) |
| ***C08F 283/02*** | (2006.01) |
| ***C08J 5/18*** | (2006.01) |

(52) U.S. Cl.

CPC .............. *B32B 15/09* (2013.01); *B32B 7/022* (2019.01); *B32B 15/18* (2013.01); *B32B 37/06* (2013.01); *B32B 37/10* (2013.01); *C08F 283/02* (2013.01); *C08J 5/18* (2013.01); *B32B 2250/02* (2013.01); *B32B 2255/06* (2013.01); *B32B 2255/205* (2013.01); *C08J 2367/02* (2013.01)

(58) Field of Classification Search

CPC ......... B29C 45/27; B32B 15/09; B32B 15/18; B32B 2250/02; B32B 2255/06; B32B 2255/205; B32B 27/06; B32B 27/36; B32B 37/0053; B32B 37/06; B32B 37/08; B32B 37/10; B32B 38/0012; B32B 38/16; B32B 5/16; B32B 7/02; B32B 7/022; C08F 283/02; C08G 63/183; C08J 2367/02; C08J 5/18; C08K 3/00; C08L 67/02; C08L 69/00

See application file for complete search history.

(56) References Cited

U.S. PATENT DOCUMENTS

| | | | |
|---|---|---|---|
| 2008/0261063 | A1 | 10/2008 | Yamanaka et al. |
| 2012/0082844 | A1 | 4/2012 | Takahashi et al. |

FOREIGN PATENT DOCUMENTS

| | | |
|---|---|---|
| CN | 101142277 | 3/2008 |
| CN | 102431269 | 5/2012 |
| CN | 102431269 B | 7/2014 |
| EP | 2839954 A1 | 2/2015 |
| EP | 2962951 A1 | 1/2016 |

OTHER PUBLICATIONS

International Search Report and Written Opinion dated Mar. 11, 2019 for PCT Patent Application No. PCT/CN2018/120006.
The extended European search report for EP 18889607.0 of PCT/CN2018120006, dated Jun. 17, 2021.

*Primary Examiner* — Lawrence D Ferguson
(74) *Attorney, Agent, or Firm* — Lei Fang, Esq.; Smith Tempel Blaha LLC

(57) ABSTRACT

Laminated steel having a low interface bubble rate, comprising: a substrate with a surface roughness of 0.15-0.25 μm and a modified flexible polyester film thermally laminated onto the surface of the substrate. The modified flexible polyester film is obtained by copolymerization modification of ethylene terephthalate with a low-molecular-weight aliphatic polyester. A method for manufacturing the laminated steel having an extremely low interface bubble rate, comprising the steps of: (1) preheating and then heating the substrate; (2) uncoiling the modified flexible polyester film at room temperature, and then thermally laminating same onto the substrate; and (3) cooling and squeeze-drying. The laminated steel having a low interface bubble rate is made of the substrate with a low surface roughness and the modified flexible polyester thermally laminated onto the surface of the substrate, so that the laminated steel has the low interface bubble rate, high product surface quality, excellent adhesion property, and is applicable for forming into deep-drawn containers.

19 Claims, No Drawings

LAMINATED STEEL HAVING EXTREMELY LOW INTERFACE BUBBLE RATE AND METHOD FOR MANUFACTURING SAME

CROSS-REFERENCE TO RELATED APPLICATIONS

This application is a 371 U.S. National Phase of PCT International Application No. PCT/CN2018/120006 filed on Dec. 10, 2018, which claims benefit and priority to Chinese patent application no. 201711324503.4 filed on Dec. 13, 2017, the content of which is incorporated by reference herein in its entirety.

TECHNICAL FIELD

The present disclosure relates to a material and a method for manufacturing the same, particularly to a film-laminated steel and a method for manufacturing the same.

BACKGROUND ART

Film-laminated steel usually refers to a composite material obtained by directly laminating a high-molecular-weight polyester film on a steel substrate by means of heating and melting. Film-laminated steel may be used for a can body or as a can lid material. As such, film-laminated steel is suitable for manufacturing food cans, beverage cans, ordinary lids, and easy-open lids. In the prior art, high-molecular-weight polyester films compounded with steel substrates include polypropylene (PP), polyethylene terephthalate (PET), polyethylene (PE), etc. Among them, PET is the most common one, because PET has excellent formability, wear resistance, and printability. Therefore, it is more commonly used.

At present, film-laminated steel is mainly used to replace traditional painted steel. This is because the production process of film-laminated steel does not involve the use of a solvent or the emission of exhaust gas, and no cleaning or coating is necessary in subsequent processing, which improves production efficiency, reduces environmental pollution and saves energy. Moreover, film-laminated steel is free of harmful chemicals, and thus ensures food safety and human health.

However, at the present stage, due to the laminating principle for film-laminated steel according to which a metal sheet is heated and a thermoplastic resin film sheet (i.e., high-molecular-weight polyester film) is squeezed through a pair of film-laminating rollers and laminated on at least one surface of the metal sheet, a large quantity of non-uniform bubbles tend to form on the surfaces of the substrate and the film if the air between the high-molecular-weight polyester film and the substrate is not expelled in time during the squeezing process of the laminating rollers in the film lamination. The formation of a lot of non-uniform bubbles may affect the properties of the film-laminated steel, such as adhesion and corrosion resistance. Particularly, after deep processing and filling of contents, film bubbling, delamination and other phenomena may occur during long-term shelf storage.

For example, in the Chinese patent document bearing a publication number of CN1201420, titled "Manufacturing Method and Manufacturing Equipment for Laminated Metal Sheets", and published on Dec. 9, 1998, it is mentioned "in an existing manufacturing method including heating a metal sheet during lamination, there is no problem if laminating at a low speed of about 20 m/min, but when laminating at a high speed of 150 m/min or more, the bubble entrapping rate (bubble rate) of the resulting laminated metal sheet may reach about 10-30% by area ratio. When the metal sheet is deep drawn in order to process it into a can container, such bubbled portions tend to cause defects on the surface, leading to decreased quality. At a high speed of 200 m/min or more, the adhesive strength is not uniform, which may decrease the adhesive strength". As can thus be seen, during the manufacturing process, too high a film-laminating speed may cause defects in the resulting product, leading to decreased product quality.

With regard to the problem of a high bubble rate, the current solutions in the prior art mainly focus on improving film-laminating equipment.

For example, in the above-mentioned Chinese patent document bearing a publication number of CN1201420, titled "Manufacturing Method and Manufacturing Equipment for Laminated Metal Sheets", and published on Dec. 9, 1998, there is disclosed a method for manufacturing a laminated metal sheet. According to the technical solution disclosed by this patent document, in the process of manufacturing a film-laminated sheet, by heating a plastic film and applying tension to the plastic film immediately after the heating, the plastic film is crimped to the metal sheet, so as to reduce entrapment of air during the lamination, thereby providing a laminated metal sheet having a low bubble rate.

For another example, in the Chinese patent document bearing a publication number of CN1212651A, titled "Manufacturing Equipment for Laminated Metal Sheets", and published on Mar. 31, 1999, there is disclosed equipment for manufacturing a laminated metal sheet. The technical solution disclosed by this patent document proposes arrangement of a support roll to apply tension to a resin film to relieve the problem with the bubble rate during the process of supplying the film from a film coil to a lamination roll, because the resin film is thinner than the metal sheet and thus wrinkles when the resin film is stretched for lamination, and the generation of more bubbles during high-speed lamination is mainly attributable to the failure of the molten and softened resin in completely leveling the uneven surface of the metal sheet.

However, there are certain limitations to the improvement of the film-laminating equipment in the above technical solutions, because not all film-laminating lines can meet such conditions. Therefore, the supply of film-laminated steel products with a low bubble rate is very limited.

In view of the above facts, it is desirable to develop a film-laminated steel product having a low bubble rate but high adaptability to laminating lines from a technical perspective with raw material substrates and films taken into account.

SUMMARY

One of the objects of the present disclosure is to provide a film-laminated steel with an extremely low interface bubble rate, wherein a substrate used for the film-laminated steel has an extremely low roughness, and a low interface bubble rate is generated when a modified flexible polyester film for thermal lamination is laminated to the substrate, thereby imparting good adhesion performance to the resulting film-laminated steel.

To achieve the above object, the present disclosure proposes a film-laminated steel having an extremely low interface bubble rate, comprising: a substrate having a surface roughness of 0.15-0.25 μm and a modified flexible polyester film thermally laminated to a surface of the substrate, wherein the modified flexible polyester film is obtained by copolymerization modification of ethylene terephthalate with a low-molecular-weight aliphatic polyester.

After strip steel is rolled and flattened, its surface actually has micro-unevenness, i.e., surface roughness. After extensive experimental studies, the inventors of the present case have discovered that, since the surface morphology of the strip steel is copied from a roll, as the surface roughness of the strip steel or roll increases, the surface parameters also change accordingly, resulting in grinding marks exhibiting higher peaks and deeper valleys. If the air residing at the peak and valley positions is not squeezed out during the laminating process, bubble defects will occur on the surface of the film-laminated steel. In other words, with higher peaks, deeper valleys and more air existing at the peak and valley positions, it's more difficult to squeeze the air out during the laminating process, and eventually more bubble defects are generated on the film-laminated steel surface. In addition, although plated strip steel may be used for the substrate, that is, a tin-plated or chrome-plated steel sheet can be used, the cladding layer is so thin (for example, the amount of chromium plated is generally 100 $mg/m^2$, that is, the thickness is on the order of 10 nm) that the cladding layer has little effect on the surface roughness of the substrate. Based on the above discoveries, the inventors contemplate the use of a substrate having an extremely low roughness (for example, a roughness of 0.15-0.25) for the film-laminated steel uses, so that the air at the peak and valley positions can be expelled more easily, thereby reducing the interface bubble rate and improving the surface quality of the film-laminated steel of the present disclosure.

Besides, after research, the inventors have further discovered that the use of a modified flexible polyester film as a film laminated to the substrate having an extremely low surface roughness has a significant effect on reducing the interface bubble rate and improving the surface quality of the film-laminated steel of the present disclosure. In the present case, the modified flexible polyester film is obtained by copolymerization modification of ethylene terephthalate with a low-molecular-weight aliphatic polyester. This is because the PET film (i.e., polyester film) obtained by conventional means, despite the good mechanical properties and heat resistance of PET itself, has a relatively large cohesive energy, a high melting point, and poor melt adhesion and melt flowability due to its own symmetric molecular structure and rigid benzene ring. Therefore, in the prior art, it's difficult for the PET film obtained by conventional means to fully fill the grooves on the surface of the substrate during the thermal lamination of the substrate. As a result, it's difficult to achieve a close fit between the interfaces, which in turn affects the adhesion performance of the product. At the same time, the rigid texture of the PET film obtained by conventional means may cause poor adhesion of the film to the substrate during the lamination of the film-laminated steel, and the PET film and the substrate may be delaminated in subsequent processes, such as stamping. In the technical solution described in the present disclosure, the inventors have significantly improved the flexibility of the rigid chain of PET and enhanced the segment mobility by means of chemical modification, so that the modified polyester has a low melting point, good melt flowability and high surface tension, thereby improving the flexibility and surface adhesion of the film. Therefore, the PET film obtained by using the modified flexible polyester film as described above provides better flexibility and surface adhesion as compared with the PET film obtained by conventional technical means, so that the bubble rate of the film-laminated steel according to the present disclosure is extremely low during the laminating process.

In summary, a substrate having an extremely low surface roughness and a modified flexible polyester film to be thermally laminated to a surface of the substrate are used for the film-laminated steel of the present disclosure to impart an extremely low interface bubble rate and high product surface quality to the film-laminated steel.

Further, in the film-laminated steel having an extremely low interface bubble rate according to the present disclosure, the molar percentage of the low-molecular-weight aliphatic polyester is 6-17%.

Further, in the film-laminated steel having an extremely low interface bubble rate according to the present disclosure, the molecular weight of the low-molecular-weight aliphatic polyester is 500-3000.

Further, in the film-laminated steel having an extremely low interface bubble rate according to the present disclosure, the low-molecular-weight aliphatic polyester is a hydroxy-terminated low-molecular-weight aliphatic polyester.

Further, in the film-laminated steel having an extremely low interface bubble rate according to the present disclosure, the low-molecular-weight aliphatic polyester is prepared from an aliphatic diol and an aliphatic diprotic acid.

Still further, in the film-laminated steel having an extremely low interface bubble rate according to the present disclosure, the aliphatic diol is selected from the group consisting of propanediol, butanediol, pentanediol, hexanediol, and neopentanediol.

Still further, in the film-laminated steel having an extremely low interface bubble rate according to the present disclosure, the aliphatic diprotic acid is selected from the group consisting of oxalic acid, succinic acid, adipic acid, sebacic acid, decane dicarboxylic acid, maleic acid, fumaric acid and dimer acid.

Further, in the film-laminated steel having an extremely low interface bubble rate according to the present disclosure, the substrate is a tin-plated substrate or a chrome-plated substrate.

Further, in the film-laminated steel having an extremely low interface bubble rate according to the present disclosure, the film-laminated steel has an interface bubble rate of 2-7%.

Further, in the film-laminated steel having an extremely low interface bubble rate according to the present disclosure, the modified flexible polyester film has a mono-layer or multi-layer structure.

In the above solution, with the extremely low surface roughness of the substrate in the present case taken into consideration, the film to be laminated to the substrate requires higher flexibility and surface tension. Therefore, the modified flexible polyester film preferably adopts a mono-layer structure or a multi-layer structure.

Further, in the film-laminated steel having an extremely low interface bubble rate according to the present disclosure, a surface of the modified flexible polyester film to be laminated to the substrate has a surface tension of ≥45 dyne.

Accordingly, another object of the present disclosure is to provide a method for manufacturing the above-mentioned film-laminated steel having an extremely low interface bubble rate. This manufacturing method has wide applicability and can produce the film-laminated steel having an extremely low interface bubble rate when the production line is run at a high speed.

In order to achieve the above object, there is provided herein a method for manufacturing the above film-laminated steel having an extremely low interface bubble rate, comprising steps of:

(1) preheating a substrate and then heating it;

(2) uncoiling a modified flexible polyester film at room temperature, and then laminating the film to the substrate; and (3) cooling and squeeze-drying.

In the manufacturing method of the present disclosure, after the substrate is heated to a desired temperature, the modified flexible polyester film is thermally laminated to the substrate. In addition, in view of the characteristics that the modified flexible polyester film has a high surface activation energy and the finishing coat covering the substrate is flexible polyester, no heating is required for providing the film in the present case, and the film is provided at room temperature. After the modified flexible polyester film is laminated to the substrate, cooling and squeeze-drying are performed to obtain the final film-laminated steel.

In some embodiments, the squeeze-drying may be performed using a squeeze roll to remove moisture from the surface of the film-laminated steel.

Further, in the manufacturing method of the present disclosure, in step (1), an induction heater is first used to preheat the substrate to 60-80% of a target film-laminating temperature, and then an induction heating roll is used to heat the substrate to the target film-laminating temperature.

Still further, in the manufacturing method of the present disclosure, the target film-laminating temperature is 180-270° C.

Further, in the manufacturing method of the present disclosure, in step (2), an angle at which the modified flexible polyester film enters a roll gap between film-laminating rolls is controlled in the range of 30-70° C.

Further, in the manufacturing method according to the disclosure, in step (2), a film-laminating speed is controlled in the range of ≥150 m/min.

Further, in the manufacturing method of the present disclosure, in step (3), during cooling, the film-laminated steel is quickly cooled by spraying water, and then the film-laminated steel is immersed in a water quenching tank for cooling.

The film-laminated steel having an extremely low interface bubble rate according to the present disclosure has an extremely low interface bubble rate, and has excellent adhesion performance. It is suitable for forming into deep-drawn containers. Particularly, a film-laminated steel having an interface bubble rate of 2-7% may be obtained by high-speed lamination at a film-laminating speed of ≥150 m/min.

In addition, for the film-laminated steel having an extremely low interface bubble rate according to the present disclosure, the interface bubble rate is not reduced by modifying the production equipment; instead, a substrate having an extremely low surface roughness is used to reduce the interface bubble rate. Therefore, the film-laminated steel according to the present disclosure is adaptive to existing production lines, and shows universal equipment compatibility.

Besides, the film-laminated steel having an extremely low interface bubble rate according to the present disclosure has a high surface tension due to the use of a modified flexible polyester film. Hence, compared with the prior art, air can be quickly and promptly expelled in the film-laminating process of the film-laminated steel according to the present disclosure, so that a long-term effective binding force can be maintained between the substrate and the laminated film.

The manufacturing method according to the present disclosure also has the above-mentioned advantages.

DETAILED DESCRIPTION

The film-laminated steel having an extremely low interface bubble rate according to the present disclosure and the method for manufacturing the same will be further explained and illustrated with reference to the specific examples. Nonetheless, the explanation and illustration are not intended to unduly limit the technical solution of the disclosure.

Examples 1-6 and Comparative Examples 1-4

Table 1 lists the types of substrates and their surface roughness used for the film-laminated steel having an extremely low interface bubble rate in Examples 1-6 and the comparative film-laminated steel in Comparative Examples 1-4.

TABLE 1

| | Surface Roughness (μm) | Substrate Type |
|---|---|---|
| Ex. 1 | 0.186 | Chrome-plated substrate |
| Ex. 2 | 0.232 | Chrome-plated substrate |
| Ex. 3 | 0.186 | Chrome-plated substrate |
| Ex. 4 | 0.232 | Chrome-plated substrate |
| Ex. 5 | 0.186 | Tin-plated substrate |
| Ex. 6 | 0.232 | Tin-plated substrate |
| Comp. Ex. 1 | 0.261 | Chrome-plated substrate |
| Comp. Ex. 2 | 0.365 | Chrome-plated substrate |
| Comp. Ex. 3 | 0.281 | Chrome-plated substrate |
| Comp. Ex. 4 | 0.375 | Tin-plated substrate |

The flexible polyester films used for the film-laminated steel having an extremely low interface bubble rate in Example 1-6 were obtained by copolymerization modification of ethylene terephthalate with low-molecular-weight aliphatic polyesters. The films used for the comparative film-laminated steel in Comparative Examples 1-4 were mono-layer polyester flexible films obtained by copolymerization modification of ethylene terephthalate with hydroxy-terminated butanediol adipate (having a molecular weight of 1000, the same as the flexible polyester film used in Example 2).

Table 2 lists the specific parameters of the modified flexible polyester films used for the film-laminated steel having an extremely low interface bubble rate in Examples 1-6.

TABLE 2

| | Low-molecular-weight aliphatic polyester | Molar percentage of low-molecular-weight aliphatic polyester | Molecular weight of low-molecular-weight aliphatic polyester | Structure of flexible polyester film | Surface tension (dyne) |
|---|---|---|---|---|---|
| Ex. 1 | Propanediol adipate | 7 | 500 | Mono-layer structure | 50 |
| Ex. 2 | Butanediol adipate | 10 | 1000 | Mono-layer structure | 50 |
| Ex. 3 | Hexanediol adipate | 10 | 1500 | Mono-layer structure | 47 |

TABLE 2-continued

| | Low-molecular-weight aliphatic polyester | Molar percentage of low-molecular-weight aliphatic polyester | Molecular weight of low-molecular-weight aliphatic polyester | Structure of flexible polyester film | Surface tension (dyne) |
|---|---|---|---|---|---|
| Ex. 4 | Butanediol maleate | 10 | 1500 | Multi-layer structure | 46 |
| Ex. 5 | Pentanediol sebacate | 15 | 2000 | Multi-layer structure | 48 |
| Ex. 6 | Butanediol decane dicarboxylate | 17 | 2500 | Multi-layer structure | 45 |

Note:
The low-molecular-weight aliphatic polyesters in Table 2 are all hydroxy-terminated low-molecular-weight aliphatic polyesters.

The method for manufacturing the film-laminated steel having an extremely low interface bubble rate in Examples 1-6 and the comparative film-laminated steel in Comparative Examples 1-4 includes the following steps:

(1) preheating a substrate listed in Table 1 and then heating it, wherein an induction heater was used to preheat the substrate to 60-80% of the target film-laminating temperature, and then an induction heating roll was used to heat the substrate to the target film-laminating temperature, wherein the target film-laminating temperature was 180-270° C.;

(2) uncoiling the film at room temperature, and then thermally laminating a modified flexible polyester film listed in Table 2 to the substrate, wherein an angle at which the modified flexible polyester film entered a roll gap between film-laminating rolls was controlled to be 30-70°, and a film-laminating speed was ≥150 m/min; and (3) cooling and squeeze-dry: during cooling, the film-laminated steel was quickly cooled by spraying water, and then the film-laminated steel was immersed in a water quenching tank for cooling.

Table 3 lists the specific process parameters for the method for manufacturing the film-laminated steel having an extremely low interface bubble rate in Examples 1-6 and the comparative film-laminated steel in Comparative Examples 1-4.

TABLE 3

| | Target film-laminating temperature (° C.) | Angle of entry into roll gap between film-laminating rolls (°) | Film-laminating speed (m/min) | Final cooling temperature (° C.) |
|---|---|---|---|---|
| Ex. 1 | 180 | 30 | 150 | 80 |
| Ex. 2 | 210 | 50 | 150 | 80 |
| Ex. 3 | 225 | 50 | 180 | 80 |
| Ex. 4 | 225 | 50 | 180 | 80 |
| Ex. 5 | 225 | 60 | 200 | 80 |
| Ex. 6 | 270 | 70 | 200 | 80 |
| Comp. Ex. 1 | 210 | 50 | 150 | 80 |
| Comp. Ex. 2 | 210 | 50 | 150 | 80 |
| Comp. Ex. 3 | 210 | 50 | 200 | 80 |
| Comp. Ex. 4 | 210 | 50 | 200 | 80 |

Performance tests were performed on the film-laminated steel having an extremely low interface bubble rate in Examples 1-6 and the comparative film-laminated steel in Comparative Examples 1-4 using the following test methods. The test results finally obtained are listed in Table 4.

Interface bubble rate: A laminate was observed with a high-resolution metallurgical microscope, wherein the bubble-like parts were viewed as the bubble. The area ratio of the bubble per unit area was calculated.

Surface adhesion performance: Adhesion force after deformation was measured using a crosshatch-cupping-tape peeling method. A 10 cm×10 cm sample was taken from the film-laminated steel. A checkerboard pattern was scored on the flat sheet at intervals of 3 mm. After the film was cut through (care should be taken not to cut the substrate), the film was deformed by cupping, wherein the highest point of the punch was kept in the central zone of a check. Then, a specialized adhesive tape was intimately adhered to the scribed and cupped zone. The tape was peeled off by gripping an end of the tape and pulling rapidly in an inclined upward direction. The degree to which the film was released was observed to evaluate the surface adhesion performance of the film.

Acid resistance performance: After the film-laminated steel was stamped into a can (can size 691), acid resistance performance evaluation was performed to represent corrosion resistance performance evaluation. The film-laminated steel can was filled with a 1.5% citric acid solution. After the can was capped, the solution was boiled at 121° C. for 30 min. After cooling, the sample was taken out, and spots corroded by the acid on the surface of the sample were observed to evaluate the acid resistance performance of the film-laminated steel.

TABLE 4

| | Interface bubble rate (%) | Surface adhesion performance | Acid resistance performance |
|---|---|---|---|
| Ex. 1 | 2 | ◎ | ◎ |
| Ex. 2 | 5 | ◎ | ◎ |
| Ex. 3 | 3 | ◎ | ◎ |
| Ex. 4 | 6 | ◎ | ○ |
| Ex. 5 | 5 | ◎ | ○ |
| Ex. 6 | 7 | ○ | ○ |
| Comp. Ex. 1 | 10 | Δ | Δ |
| Comp. Ex. 2 | 13 | Δ | Δ |
| Comp. Ex. 3 | 18 | Δ | X |
| Comp. Ex. 4 | 20 | X | X |

Note:
in Table 4,
X means poor;
Δ means fair;
○ means good;
◎ means very good.

As can be seen from Table 4, the interface bubble rate of the film-laminated steel in the various examples of the present case is 2-7%, which is significantly lower than that of the comparative film-laminated steel of the various comparative examples, thus illustrating that the interface bubble rate of the film-laminated steel in the various examples of the present case is extremely low. In addition, the film-laminated steel in the various examples of the present case exhibits higher surface performances due to the extremely low interface bubble rate, especially in terms of surface adhesion performance and acid resistance performance, which are superior to the performances of the comparative film-laminated steel in the various comparative examples. This is because substrates having an extremely low roughness are used in the various examples of the present case, and thus the interface bubble rate can be maintained between 2% and 7% at a high speed of film lamination. Therefore, at the same speed, the bubble rate of the comparative film-laminated steel in the various comparative examples having a surface roughness that is higher than the surface roughness in the examples of the present case is significantly higher. Meanwhile, with the increase of the interface bubble rate, the surface adhesion performance of the highly deformed comparative film-laminated steel in the various comparative examples is gradually deteriorated. In the case of high deformation, bubbles will be stretched with the deformation. That is, the defects are magnified. In the acid resistance test where the can is filled with an acid and simulated cooking is performed, defects are spotted more strictly. As shown by Table 4, with the increase of the surface bubble rate, the acid resistance of the comparative film-laminated steel in the various comparative examples is gradually deteriorated. This indicates that, in order to obtain a film-laminated steel exhibiting better performances in applications involving high deformation, the interface bubble rate of the film-laminated steel should be controlled more strictly. The interface bubble rate of the film-laminated steel in the various examples of the present case is extremely low, and high surface performances are obtained.

It's to be noted that the prior art portions in the protection scope of the present disclosure are not limited to the examples set forth in the present application file. All the prior art contents not contradictory to the technical solution of the present disclosure, including but not limited to prior patent literature, prior publications, prior public uses and the like, may all be incorporated into the protection scope of the present disclosure.

In addition, the ways in which the various technical features of the present disclosure are combined are not limited to the ways recited in the claims of the present disclosure or the ways described in the specific examples. All the technical features recited in the present disclosure may be combined or integrated freely in any manner, unless contradictions are resulted.

It should also be noted that the Examples set forth above are only specific examples according to the present disclosure. Obviously, the present disclosure is not limited to the above Examples. Similar variations or modifications made thereto can be directly derived or easily contemplated from the present disclosure by those skilled in the art. They all fall in the protection scope of the present disclosure.

What is claimed is:

1. A film-laminated steel comprising: a substrate having a surface roughness of 0.15-0.25 μm and a modified flexible polyester film thermally laminated to a surface of the substrate, wherein the modified flexible polyester film is obtained by copolymerization modification of ethylene terephthalate with a hydroxy-terminated low-molecular-weight aliphatic polyester.

2. The film-laminated steel according to claim 1, wherein the hydroxy-terminated low-molecular-weight aliphatic polyester has a molar percentage of 6-17%.

3. The film-laminated steel according to claim 1, wherein the hydroxy-terminated low-molecular-weight aliphatic polyester has a molecular weight of 500-3000.

4. The film-laminated steel according to claim 1, wherein the hydroxy-terminated low-molecular-weight aliphatic polyester is prepared from an aliphatic diol and an aliphatic diprotic acid.

5. The film-laminated steel according to claim 4, wherein the aliphatic diol is selected from the group consisting of propanediol, butanediol, pentanediol, hexanediol, and neopentanediol.

6. The film-laminated steel according to claim 4, wherein the aliphatic diprotic acid is selected from the group consisting of oxalic acid, succinic acid, adipic acid, sebacic acid, decane dicarboxylic acid, maleic acid, fumaric acid and dimer acid.

7. The film-laminated steel according to claim 1, wherein the substrate is a tin-plated substrate or a chrome-plated substrate.

8. The film-laminated steel according to claim 1, wherein the film-laminated steel has an interface bubble rate of 2-7%.

9. The film-laminated steel according to claim 1, wherein the modified flexible polyester film has a mono-layer or multi-layer structure.

10. The film-laminated steel according to claim 1, wherein a surface of the modified flexible polyester film to be laminated to the substrate has a surface tension of ≥45 dyne.

11. A manufacturing method for the film-laminated steel according to claim 1, comprising steps:

(1) preheating a substrate and then heating it;

(2) uncoiling a modified flexible polyester film at room temperature, and then laminating the film to the substrate; and (3) cooling and squeeze-drying.

12. The manufacturing method according to claim 11, wherein in step (1), an induction heater is first used to preheat the substrate to 60-80% of a target film-laminating temperature, and then an induction heating roll is used to heat the substrate to the target film-laminating temperature.

13. The manufacturing method according to claim 11, wherein the target film-laminating temperature is 180-270° C.

14. The manufacturing method according to claim 12, wherein in step (2), an angle at which the modified flexible polyester film enters a roll gap between film-laminating rolls is controlled in the range of 30-70° C.

15. The manufacturing method according to claim 11, wherein in step (2), a film-laminating speed is controlled in the range of ≥150 m/min.

16. The manufacturing method according to claim 11, wherein in step (3), during cooling, the film-laminated steel is quickly cooled by spraying water, and then the film-laminated steel is immersed in a water quenching tank for cooling.

17. The manufacturing method according to claim 11, wherein the hydroxy-terminated low-molecular-weight aliphatic polyester of the film-laminated steel has a molar percentage of 6-17%, or a molecular weight of 500-3000.

18. The manufacturing method according to claim 11, wherein the hydroxy-terminated low-molecular-weight aliphatic polyester is prepared from an aliphatic diol and an aliphatic diprotic acid, wherein the aliphatic diol is selected from the group consisting of propanediol, butanediol, pentanediol, hexanediol, and neopentanediol, and the aliphatic diprotic acid is selected from the group consisting of oxalic acid, succinic acid, adipic acid, sebacic acid, decane dicarboxylic acid, maleic acid, fumaric acid and dimer acid.

19. The manufacturing method according to claim 11, wherein the substrate is a tin-plated substrate or a chrome-plated substrate, the film-laminated steel has an interface bubble rate of 2-7%, the modified flexible polyester film has a mono-layer or multi-layer structure, and/or a surface of the modified flexible polyester film to be laminated to the substrate has a surface tension of ≥45 dyne.

* * * * *